(12) United States Patent
Cordell et al.

(10) Patent No.: US 6,996,456 B2
(45) Date of Patent: Feb. 7, 2006

(54) ROBOT WITH TACTILE SENSOR DEVICE

(75) Inventors: Andrew W. Cordell, McKinney, TX (US); Keith W. Redding, McKinney, TX (US)

(73) Assignee: FSI International, Inc., Chaska, MN (US)

(*) Notice: Subject to any disclaimer, the term of this patent is extended or adjusted under 35 U.S.C. 154(b) by 45 days.

(21) Appl. No.: 10/369,204

(22) Filed: Feb. 19, 2003

(65) Prior Publication Data

US 2004/0078114 A1    Apr. 22, 2004

Related U.S. Application Data

(60) Provisional application No. 60/419,991, filed on Oct. 21, 2002.

(51) Int. Cl.
*G05B 15/00* (2006.01)
*G05B 19/00* (2006.01)

(52) U.S. Cl. .................. 700/258; 700/245; 700/248; 700/249; 700/250; 700/251; 700/252; 700/253; 700/257; 700/259; 700/260; 700/261; 700/262; 700/263; 318/568.11; 318/568.12; 318/568.16; 901/9; 901/227; 901/30; 901/42; 901/47; 219/124.34; 73/862.64; 73/865.7

(58) Field of Classification Search .............. 700/245, 700/248–253, 257–264; 318/568.11, 568.12, 318/568.16; 901/9, 27, 30, 42, 47; 219/124.34; 73/862.064, 865.7

See application file for complete search history.

(56) References Cited

U.S. PATENT DOCUMENTS

| | | | |
|---|---|---|---|
| 5,010,774 A | * | 4/1991 | Kikuo et al. ........... 73/862.046 |
| 5,373,747 A | * | 12/1994 | Ogawa et al. ......... 73/862.581 |
| 5,740,328 A | | 4/1998 | Ravani et al. ................. 395/93 |
| 5,931,626 A | | 8/1999 | Theriault ..................... 414/217 |
| 6,037,753 A | | 3/2000 | Uematsu et al. ............... 322/29 |
| 6,075,334 A | | 6/2000 | Sagues et al. ......... 318/568.11 |
| 6,124,560 A | * | 9/2000 | Roos et al. .................. 209/578 |
| 6,233,503 B1 | * | 5/2001 | Yim et al. ................... 700/245 |
| 6,242,879 B1 | | 6/2001 | Sagues et al. .............. 318/567 |
| 6,243,621 B1 | * | 6/2001 | Tao et al. .................... 700/245 |
| 6,243,622 B1 | * | 6/2001 | Yim et al. ................... 700/245 |
| 6,271,835 B1 | | 8/2001 | Hoeksma ..................... 345/168 |

(Continued)

FOREIGN PATENT DOCUMENTS

JP    6-110543    4/1994

OTHER PUBLICATIONS

Sekimoto et al., A simple driving device for a vehicle—Implementation and evaluation, 1997, IEEE, pp. 147-154.*

(Continued)

*Primary Examiner*—Thomas G. Black
*Assistant Examiner*—McDieunel Marc
(74) *Attorney, Agent, or Firm*—Kagan Binder, PLLC

(57) ABSTRACT

Methods and apparatuses for calibrating and teaching a robot to accurately work within a work environment. The present invention preferably provides one or more tactile sensor devices that may be operatively coupled with a robot or positioned at one or more desired locations within a work environment of the robot. In one aspect of the present invention a method comprises the steps of providing a touch sensitive surface in the work environment, causing the touch sensitive surface to contact an object, generating a signal indicative of the position of the contact with respect to the touch sensitive surface, and using information comprising the generated signal to teach the robot the location of the contact in the work environment.

24 Claims, 9 Drawing Sheets

U.S. PATENT DOCUMENTS

| | | | |
|---|---|---|---|
| 6,285,920 B1 | 9/2001 | McGee et al. | 700/254 |
| 6,292,357 B1 | 9/2001 | Zamora et al. | 361/680 |
| 6,304,051 B1 | 10/2001 | Sagues et al. | 318/568.11 |
| 6,317,835 B1 | 11/2001 | Bilger et al. | 713/194 |
| 6,323,616 B1 | 11/2001 | Sagues et al. | 318/568.11 |
| 6,335,725 B1 | 1/2002 | Koh et al. | 345/173 |
| 6,360,144 B1 | 3/2002 | Bacchi et al. | 700/250 |
| 6,366,830 B2 | 4/2002 | Bacchi et al. | 700/250 |
| 6,377,011 B1 * | 4/2002 | Ben-Ur | 318/566 |
| 6,377,228 B1 | 4/2002 | Jenkin et al. | 345/1.3 |
| 6,388,655 B1 | 5/2002 | Leung | 345/157 |
| 6,395,863 B2 | 5/2002 | Geaghan | 528/196 |
| 6,411,283 B1 | 6/2002 | Murphy | 345/173 |
| 6,411,284 B1 | 6/2002 | Junghans | 345/173 |
| 2001/0013511 A1 | 8/2001 | Hong | 219/124.34 |

OTHER PUBLICATIONS

Kekimoto et al., An implementation of a human interface using a touch panel and visual images for controlling a vehicle, 1996, IEEE, pp. 451-455.*

Bischoff et al., The MORPHA style guide for icon-based programming, 2002, IEEE, pp. 482-487.*

* cited by examiner

ROBOT WITH TACTILE SENSOR DEVICE

This application claims the benefit of U.S. Provisional Application Ser. No. 60/419,991, filed Oct. 21, 2002, entitled "ROBOT WITH TACTILE SENSOR DEVICE," which application is incorporated herein by reference in its entirety.

FIELD OF THE INVENTION

The present invention relates to robotic handling systems. In particular, the present invention is directed to apparatuses and methods for transferring objects between various locations within a work environment wherein a tactile sensor is used to calibrate positional relationships.

BACKGROUND OF THE INVENTION

In fabricating typical microelectronic devices, certain objects are often transferred between various locations within a work environment by robotic handling systems. These objects frequently include substrates or wafers for forming microelectronic devices. They may be substrates including partially or fully completed microelectronic devices, cassettes or other carriers, or other objects needed to be moved between different locations. The robots used must be able to pick up objects from a particular location such as a cassette or other carrier, processing station, another robot, or an entry/exit station, and then transfer them to a desired location. Usually, these robots include an end effector mounted to an end of a robot arm to facilitate transfer of such objects. These transfers desirably take place without crashing the robot or damaging the objects and are desired to occur quickly so as to maximize production throughput. In other words, rapid and accurate robot movements are desired. In order to perform these transfers, the robot generally needs to accurately know the spatial coordinates of at least some portion of an end effector and/or other components with respect to the spatial coordinates of the pickup and destination positions.

Generally, a robot body is fixed to a base support and an articulated robot arm is cantilevered from the robot body. The robot arm includes a first arm section pivotably attached to a second arm section. A wand or end-effector, whose outer end is generally y-shaped with spaced apart fingers, is pivotably attached to the second arm section. Vacuum ports (not shown), or edge gripping mechanisms, are usually provided on the end effector, which enable it to retain a wafer in order to pick up and transport the wafer from a cassette to a process station and vice-versa. In other instances, the robot base is not fixed but rather is moveable along track(s) or the like.

Robot mechanisms can have one or multiple degrees of freedom. The number of degrees of freedom of a robot corresponds with the number of independent position variables that must be specified to locate all parts of the mechanism. For example, robotic systems having three degrees of freedom have been used because of their relative simplicity. One such three-axis robot is described in U.S. Pat. No. 6,242,879 to Sagues et al. The Sagues et al. robot has three axes of movement, which allow the robot to move in the radial (R), angular or theta ($\Theta$), and vertical (Z) directions.

More complex robotic systems having six or more degrees of freedom are utilized as well. In most robots, the links of the robot form an open kinematic chain, and because each joint position is usually defined with a single variable, the number of joints corresponds with the number of degrees of freedom. As such, robots with 6 or more degrees of freedom can move in x, y, z, yaw, pitch, and roll.

In typical systems, the general geometry of the robot and the various process stations is known. That is, the approximate dimensional relationships between the robot and each location of interest are known, within nominal tolerances, from design specification or physical measurements. Generally, however, such information may not be accurate enough to assure that the robot can operate properly without damaging any systems component or the objects being handled. In order to assure the close tolerances required for the necessary precision during object transfer, a robot positioned within a working environment is usually taught where certain locations of the environment are. This teaching can be manual, semi-automated, or fully automated. Robot teaching or robot calibration, if automated, is referred to as autoteaching or autocalibration. Additionally, whenever the system is serviced or a machine component wears, settles, or malfunctions and requires replacement, upgrade, or service, the robot must be re-taught positions relative to the modified component(s) because the robot cannot automatically adapt to such variations. If the robot is not re-taught properly within close tolerances, serious damage to the robot or loss of expensive objects such as wafers or objects can result.

Manual teaching typically occurs without the help of sensors on the robot and/or sensors distributed around the environment of the robot. Besides consuming many hours, manual teaching procedures can introduce subjectivity, and thus a significant possibility for errors. This creates a problem of reproducibility.

Thus, automated procedures would be more desirable in many applications. One example of an automated approach for teaching a wafer transfer robot can be found in U.S. Pat. No. 6,075,334 to Sagues et al. This patent purportedly describes a system for automatically calibrating a wafer handling robot so that the robot can move wafers among precise locations within the range of motion of the robot. The system includes a controller having memory and logic sections connected to a robot having an articulated arm that is movable in three degrees of movement. Dimensional characteristics of the robot wand and the enclosures are stored in the controller memory.

The robot of U.S. Pat. No. 6,075,334 uses a thin beam laser sensor, a continuous beam sensor, and a reflective LED sensor. These sensors are provided at each enclosure and/or the robot wand, which are activated and then provide signals to the controller that are relative to the wand position. The robot is programmed to execute a series of progressive movements at each enclosure location, which are controlled by a combination of sensor response signals and the appropriate dimensional characteristics. At the end of the programmed movements, the robot wand is positioned within a process station or cassette so that it can engage for removal or release an object therein at a precise predetermined location.

Another automated approach for teaching a wafer transfer robot can be found in U.S. Pat. No. 6,242,879 to Sagues et al. In this patent a method and apparatus for automatically calibrating the precise positioning of a wafer handling robot relative to a target structure is described. The apparatus includes a machine controller connected to a robot having an end-effector with three degrees of movement. The controller has a memory with stored approximate distance and geometrical data defining the general location of structural features of the target structure. The robot is programmed to move toward the target structure in a series of sequential movements, each movement culminating with the robot end-effector touching a preselected exterior feature of the target structure. Each touching of the end-effector is sensed by utilizing motor torque variations. This provides data for the controller, which then calculates the precise location of the target structure. The data accumulated during a series of touching steps by the robot end-effector is utilized by the controller to provide a precise calibrated control program for future operation of the robot.

The light beam sensor approach and the torque sensing approach described in U.S. Pat. No. 6,075,334 to Sagues et al. and U.S. Pat. No. 6,242,879 to Sagues et al. suffer from several limitations. In particular, both approaches can be difficult to utilize with robots having more than three degrees of movement as more degrees of motion generally require more numerous and complex sensing movements. Increased complexity of the sensing approach can be expensive and can introduce difficulties in calibration and teaching especially where precise sensing is not possible. Moreover, motor torque sensing is generally limited to single axis motion such as planar motion for teaching of slots of a cassette. Thus, this type of sensing cannot handle non-planar motion such as is required for accommodating multiple entry angles for certain cassettes or the like.

Touch sensitive devices, also referred to as "tactile sensor devices," "touch screens," "touch pads," or "touch panels" are widely used in many applications, including computer interfaces, personal data assistants, cellular telephones, and the like. Touch sensitive devices allow a user to interface with a machine by touching a surface of the device. These devices use several technologies to determine the position of a touch on the surface. Advantageously, these devices not only detect the occurrence of a touch, but the location of the touch as well. Common technologies used include electrodes, resistive networks, surface acoustic waves, and other types of technology. The tactile sensing or touch-sensitive device translates the touch location to input signals for processing by a computer or other device. For example, certain touch sensitive devices such as touch panels include a conductive faceplate. A touch anywhere on this conductive faceplate changes electrical impedances on a conductive coating of the faceplate. These impedances when measured can be used to indicate not just that a touch occurred but also the location of the touch on the touch sensitive surface.

SUMMARY OF THE INVENTION

The present invention provides methods and apparatuses useful for teaching and/or calibrating a robot to accurately work within a work environment. In particular, the present invention provides one or more tactile sensor devices that may be operatively coupled with a robot, such as on an end effector, and/or that may be positioned at one or more desired locations within a work environment. In practical effect, the present invention, in broad aspects, uses tactile sensor devices as touch sensors for robot calibration and/or teaching.

The use of a tactile sensor device such as one including a touch sensitive surface or the like for robot teaching and calibration procedures can advantageously simplify many aspects of these procedures. For example, certain touch sensitive surfaces can output a signal indicative of precise positional information within a coordinate system such as an X-Y coordinate system because of a high-resolution capability. Also, certain touch sensitive surfaces can provide information related to touch force that can be used to enhance the accuracy and repeatability of sensing. Thus, tactile sensor devices such as touch sensitive surfaces or touch screens can provide highly accurate positional information for the benefit of a robot.

It is believed that any application wherein a robot interacts with a work environment can benefit from the inventive concept of the present invention. As a result, the choice of robot and work environment is not particularly limited. The invention is particularly suitable for robotic applications where a multi-axis robot operates within a defined environment and moves to or interacts with various locations, modules, or stations within the environment. It is believed, that the present inventive concept will prove particularly advantageous when utilized with robots contemplated to handle fungible payloads such as substrates or wafers or carriers for such substrates. Robots for handling such objects typically find use in semiconductor processing applications.

In one aspect of the present invention a method of teaching a robot a position within a work environment of the robot is provided. The method comprises the steps of providing a touch sensitive surface in the work environment, causing the touch sensitive surface to contact an object, generating a signal indicative of the position of the contact with respect to the touch sensitive surface, and using information comprising the generated signal to teach the robot the location of the contact in the work environment.

In another aspect of the present invention a method of calibrating a tactile sensor device positioned on a moveable component of a robot is provided. The method comprises the steps of providing a tactile sensor device on a moveable component of a robot, determining positional information by contacting a plurality of locations on the tactile sensor device with a reference structure, and using the determined positional information to calibrate the robot.

In another aspect of the present invention a tactile sensor system for providing positional information about a moveable component of a robot is provided. The system comprises a tactile sensor device and a control system. The tactile sensor device includes at least one touch sensitive zone capable of providing positional information in a frame of reference of the touch sensitive zone about an object contact between the touch sensitive zone and a structure. Preferably, the positional information comprises data indicative that a contact occurred and indicative of the location in the frame of reference of the touch sensitive zone where the contact occurred. The control system preferably uses information comprising information from the tactile sensor device to determine the position of the moveable component of the robot in the work environment of the robot.

BRIEF DESCRIPTION OF THE DRAWINGS

The accompanying drawings, which are incorporated in and constitute a part of this specification, illustrate several aspects of the invention and together with the description of the preferred embodiments, serve to explain the principles of the invention. A brief description of the drawings is as follows.

DETAILED DESCRIPTION

Figure 1:
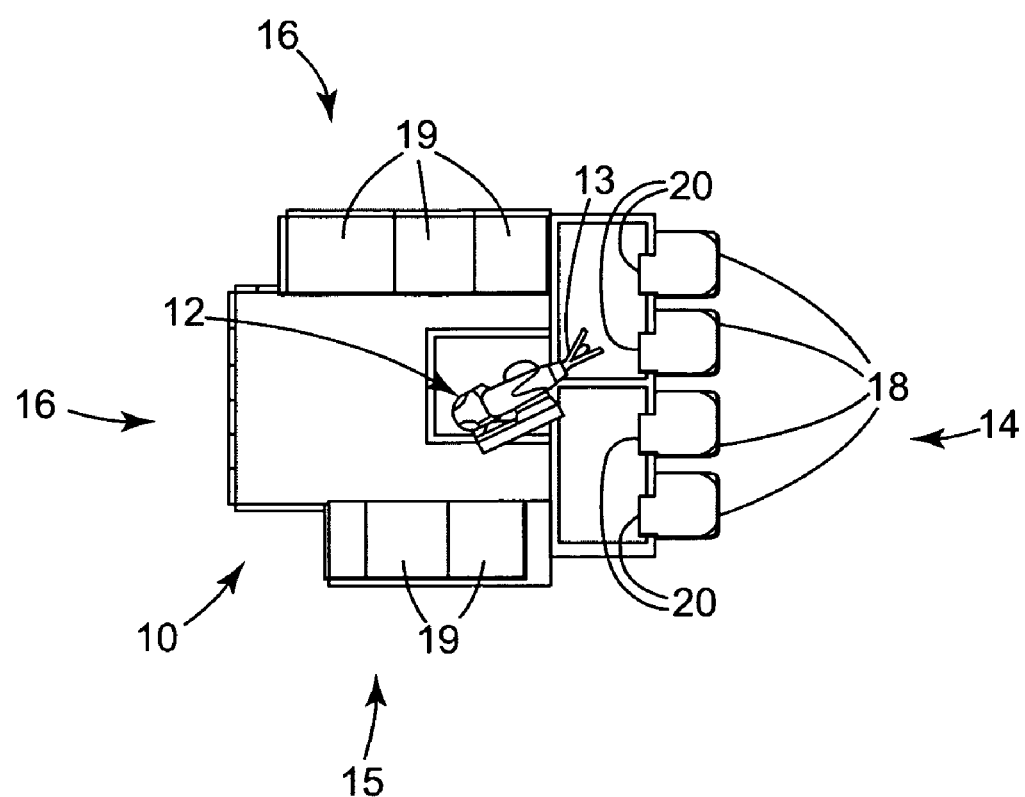
FIG. 1 is a top schematic view of a tool cluster for fabricating microelectronic devices and having a robot and several processing stations that can be used in combination with the present invention where the robot includes six degrees of freedom for the purposes of illustration.

The embodiments of the present invention described below are not intended to be exhaustive or to limit the invention to the particular embodiments disclosed in the following detailed description. Rather, the embodiments are described so that others, particularly those skilled in the art, can understand the principles and practices of the present invention.

The terms "tactile sensor device," "touch screen," "touch pad," or "touch panel" as used herein, generally refer to a device having a touch sensitive surface that can detect contact with another tangible structure, object, entity, or the like. In particular, a touch sensitive surface can indicate not only that the surface is touched but also can provide positional information about where the surface is touched such as information with respect to a frame of reference or coordinate system or the like of the touch sensitive surface. Such positional information can advantageously be used to determine the position of a robot within one or more frames of reference associated with the robot. Such devices may comprise a single touch sensitive surface or may comprise plural touch sensitive surfaces or regions, which surfaces are preferably planar but may be non-planar or curved. These devices may incorporate touch screens, touch pads, touch sensitive input devices, etc.

Generally, a tactile sensor device, such as a touch screen, can provide an output into a frame of reference such an X-Y coordinate frame or a polar frame. As an example, a touch screen that includes a 4096×4096 array of pixels, with $X_1$, $X_2 \ldots X_{4096}$ columns of pixels, and $Y_1$, $Y_2 \ldots Y_{4096}$ rows of pixels may be provided. Each individual pixel may be identified by a particular set of $X_i$, $Y_j$ coordinates, e.g. ($X_{100}$, $Y_{2000}$). When the touch screen is touched, the touch screen can identify precisely which pixel or region of pixels was touched. As such, the touch data in this particular example is in the form of (X,Y) data in the coordinate frame of reference of the touch screen. In other words, a touch sensitive surface can detect a touch as well as accurately determine precisely where a touch occurred on a touch sensitive surface. In contrast, a robot may have a different reference frame such as, X, Y, Z, R, $\Theta$, etc. This is generally because most touch screens are flat surfaces (but may be curved) and provide touch information in a two-dimensional or planar frame of reference. A frame of reference for a robot, however, may relate to three-dimensional space. Thus, it is desirable to coordinate the frame reference of a touch screen with the frame of reference of the robot so that when a touch occurs, the robot knows where the touch is in the frame of reference of the robot.

For certain applications, a tactile sensor device can accurately detect features (such as the reference structure described below) of a work environment (sometimes called a work cell or work envelope) by contacting such features and reporting positional information about the features, within a frame of reference of the tactile sensor device. The information may then be used in a suitable format and fashion, either directly or indirectly, to help determine positional information about the robot within a frame of reference of the robot. Preferably, for instance, by causing the tactile sensor device to contact features of a work environment, and by coordinating frame of references of tactile sensor devices and robot, the robot can accurately learn the positions of desired locations of a work environment.

FIG. 1 schematically shows a representative tool cluster 10, such as the POLARIS® 2500 or POLARIS® 3500 series cluster tools available from FSI International, Inc., Chaska, Minn., and Allen, Tex. which, as shown, includes front 14, sides 15 and 16, and rear 17. The front 14 of tool cluster 10 is preferably provided with one or more interfaces 20 through which batches of substrates or wafers, typically carried in a suitable holder such as industry-standard front opening unified pods (FOUP's) 18, may be transported into and taken from tool cluster 10. For purposes of illustration, tool cluster 10 includes four such FOUP's 18. The tool cluster 10 also preferably includes modules 19, which may comprise stacks of functional units that can be used to house processing stations, controls, plumbing, supplies, and the like. Such modules 19 may also include for example, intro/exit stations, processing stations such as spin-coating stations, developing stations, thermal processing stations, stepper stations, wafer storage or staging stations, and the like.

Preferably, tool cluster 10 includes at least one robot 12 that utilizes an automatic calibration and teaching system embodying the principles of the present invention. As shown, the robot 12 is positioned within the tool cluster 10 such that an end effector 13 can reach the FOUP's 18 and modules 19 so that the robot 12 can move wafers in and out of the FOUP's 18 and to and from the modules 19. Thus, the robot 12 comprises many capabilities, including one or more of picking up wafers; transferring a wafer from one locale to another; releasing a wafer at a particular locale; mapping batches of wafers held vertically, horizontally, or otherwise in a wafer carrier; autoteaching or autocalibration of the robot 12; and the like. It is noted that the tool cluster 10 may include additional robots, which may interact with each other such as by transferring wafers from one robot to another robot as well as moving wafers between various locations.

Figure 2:
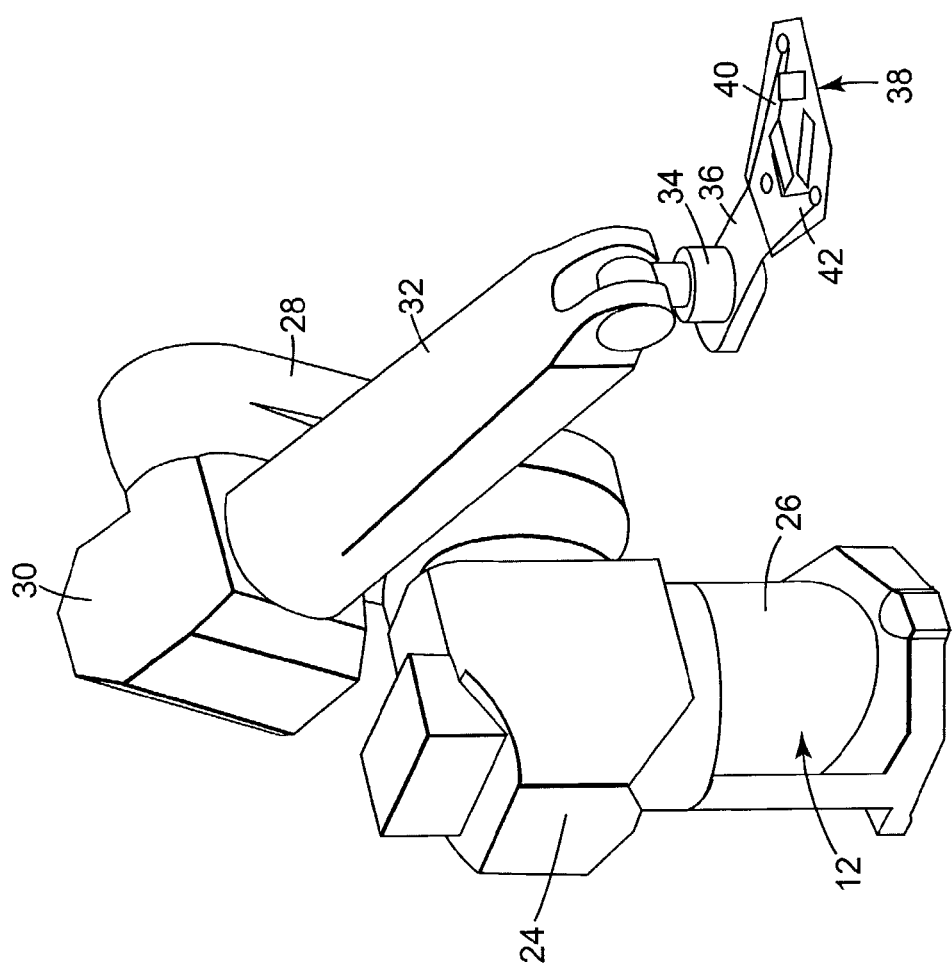
FIG. 2 is a perspective view of the robot of FIG. 1 and showing in particular a tactile sensor device of the present invention positioned on an end effector of the robot.

As shown in greater detail in FIG. 2, the exemplary robot 12 has a first body section 24 rotatably attached to a fixed base support 26. The robot 12 further includes a first link 28 pivotably attached to a second body section 30. A second link 32 is also rotatably attached to the second body section 30. Positioned at an end of the second link 32 is a linkage 34, which is pivotably attached to the second link 32 at a first end and which is further rotatably attached to an end effector 36 and a second end. Also, a preferred tactile sensor device 38, which is described in detail below, is shown positioned on the end effector 36. It is noted that the robot 12 is of a type that is commercially available and other types of robots having various arrangements for controllably moving an end effector within a work environment may be used within the scope of the invention.

As shown, the outer end of the preferred end effector 36 is generally y-shaped with spaced apart fingers 40 and 42. End effector 36 is generally provided with any suitable mechanism(s) (not shown) that allow end effector 36 to releasably engage wafers for pick up, transfer, and drop off. Any suitable mechanism that provides such releasable engagement may be used. Examples include edge gripping mechanism(s), vacuum engaging mechanism(s), mechanism(s) that operate in whole or in part via the bernoulli effect, combinations of these, and the like. Edge gripping mechanisms provide excellent control over wafer engagement in a wide range of wafer orientations and are preferred.

The exemplary robot 12 has six degrees of movement in the x, y, z, yaw, pitch, and roll directions. Preferably, the robot 12 includes one or more motors (not shown) that can independently control the movement of the robot in the x, y, z, yaw, pitch, and roll directions. The motor(s) of the robot 12 are preferably electrically connected to one or more machine controllers (not shown) for directing the motion of the robot. A tool control point is preferably defined mathematically in the robot controller(s) as the point to which all translation and rotation commands are applied. Details of these motors and of the controller(s) are well known commercially.

As mentioned above, the tactile sensor device 38 can be used to accurately detect features, such as a reference structure, of a work envelope of a robot by contacting such features. When contact occurs, a signal indicative of the location of the touch on the sensing surface is generated. In the meantime, the system is aware of the corresponding position of the robot. By coordinating the frame(s) of reference of the robot and sensor, the robot is taught the precise location of the touch.

Figure 3:
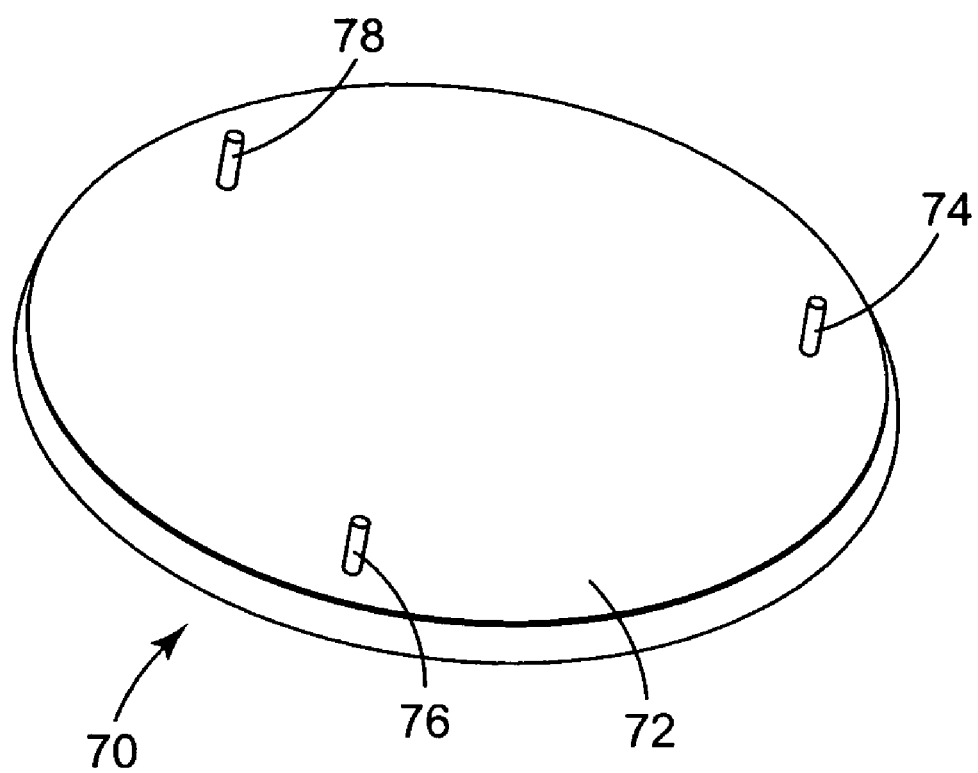
FIG. 3 is a perspective view of an illustrative reference structure of the present invention.

An exemplary reference structure 70 is illustrated in FIG. 3. The reference structure 70 comprises a platen 72, which may actually be or may otherwise simulate a substrate or wafer processing station requiring delivery of wafers or substrates by robot 12. The reference structure 70 also preferably includes pins 74, 76, and 78, which may be utilized for calibration and/or teaching by touching the tactile sensor device 38 as described below. The reference structure 70 may be positioned at any desired location to be learned by the robot 12. For example, the reference structure 70 may be attached or built into a substrate holder, cassette, FOUP, process station, storage location, pathway, or the like. Alternatively, the reference structure 70 may be attached or built into the robot 12 such that it could be used with a tactile sensor device positioned within the work environment of the robot.

Figure 4:
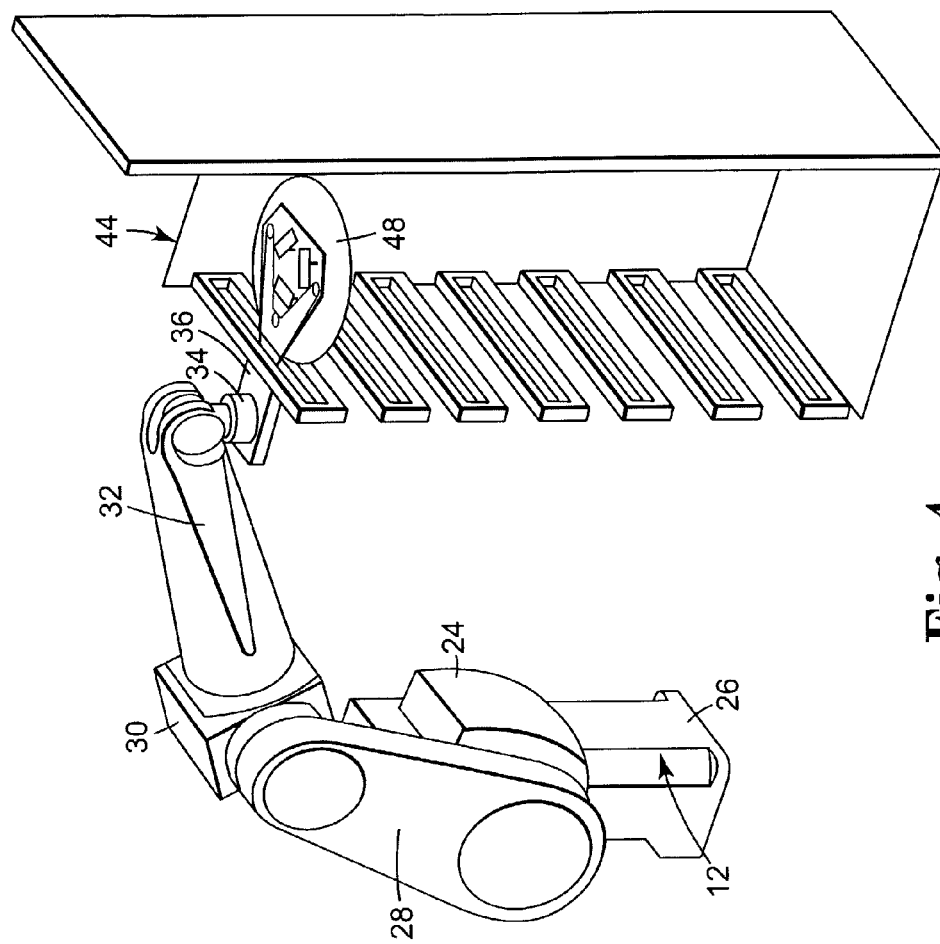
FIG. 4 is a perspective view of the robot of FIG. 2 shown with the tactile sensor device positioned above a processing platen of a processing station.
Figure 5:
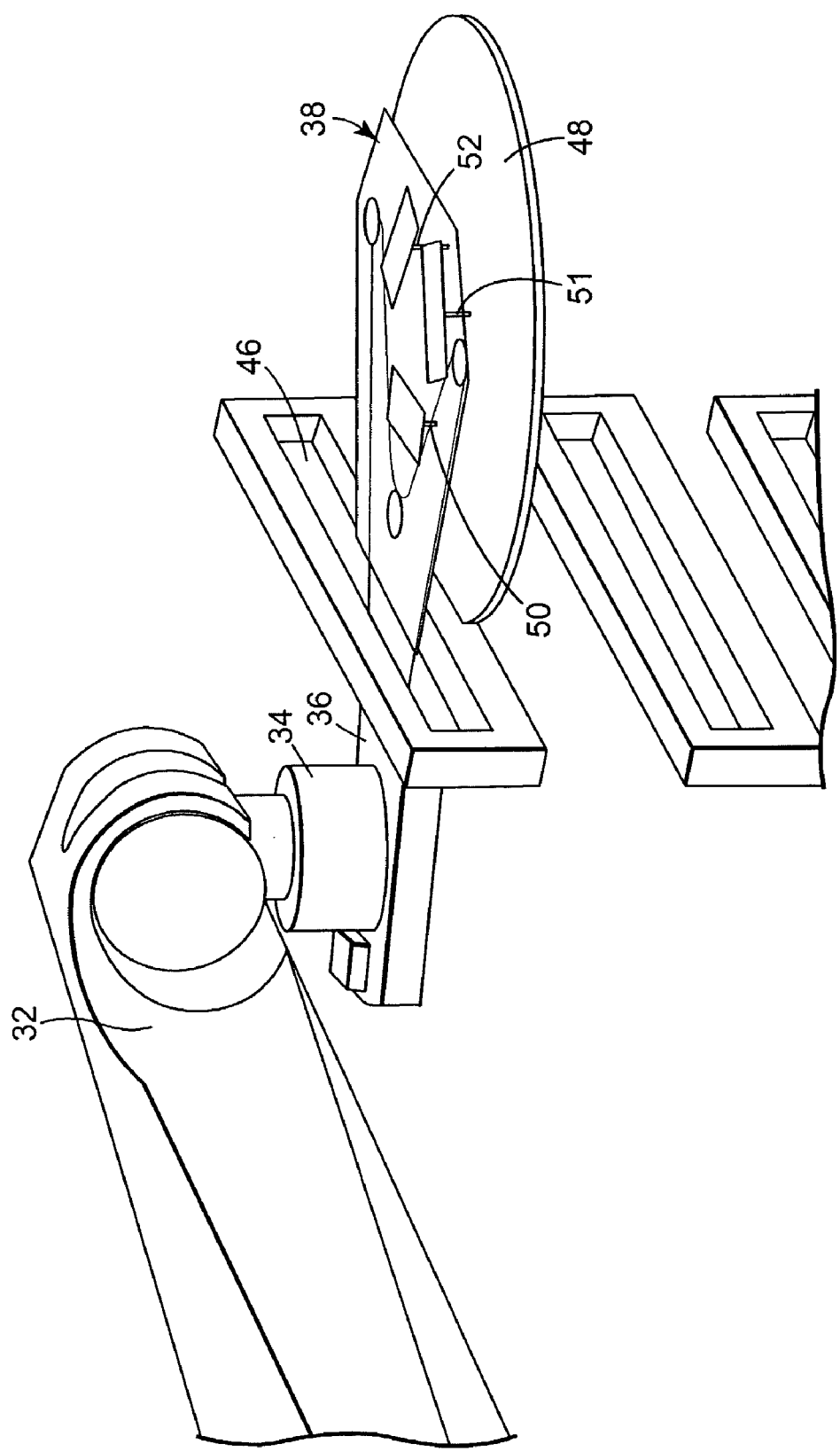
FIG. 5 is an additional perspective view of the robot, tactile sensor, and processing station of FIG. 4.

In FIGS. 4 and 5, the robot 12 is shown with the end effector 36 having the tactile sensor device 38 positioned thereon reaching into a process station 44 through an opening 46. As illustrated, the process station 44 includes a process platen 48. Preferably, the process platen 48 includes lift pins 50, 51, and 52, which lift pins are movable with respect to the process platen. The lift pins 50, 51, and 52 may be moved to a raised position by moving the lift pins 50, 51, and 52 and/or by moving the platen 48. The lift pins 50, 51, and 52 function to support a wafer positioned on the lift pins 50, 51, and 52 at a desired location with respect to the process platen 48. For example, a wafer (not shown) carried by the end effector 36 may be positioned on the lift pins 50, 51, and 52 while the lift pins 50, 51, and 52 are raised with respect to the process platen 48. The raised lift pins allow the end effector 36 to be lowered so that the wafer can be placed on the lift pins 50, 51, and 52 accordingly. Thus, the location of the lift pins 50, 51, and 52 within a work environment is desired and may be taught to the robot 12 by utilizing the inventive principles of the present invention. That is, lift pins themselves may serve as reference structures at this particular location and there is no need in this instance for separate reference structure 70 as shown in FIG. 3.

Figure 6:
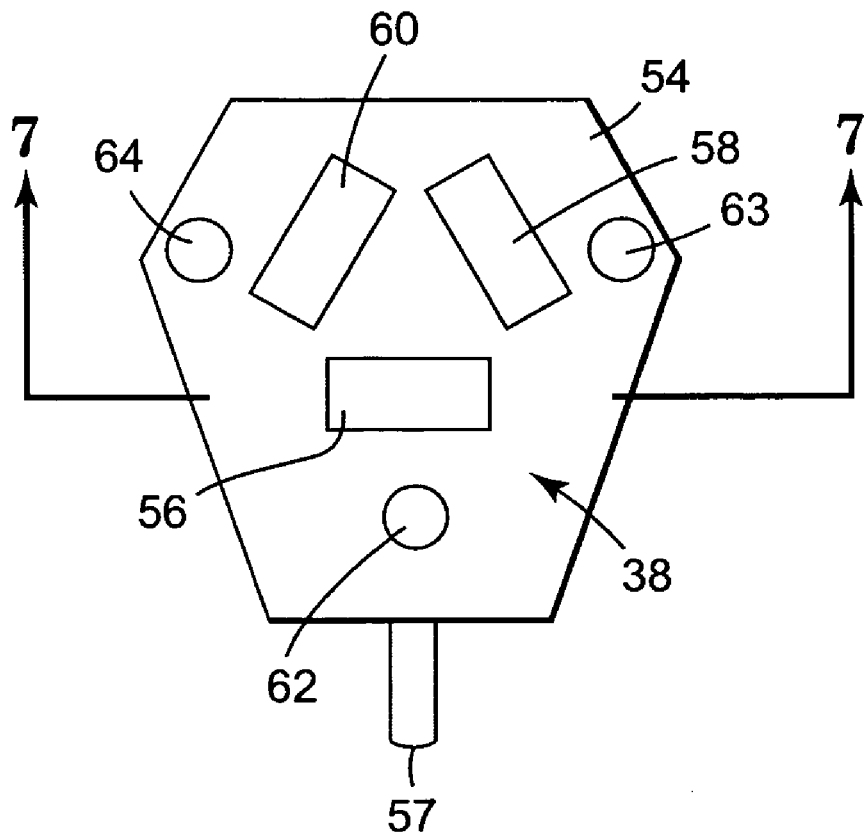
FIG. 6 is a top view of the tactile sensor device of the present invention shown in FIG. 2.
Figure 7:
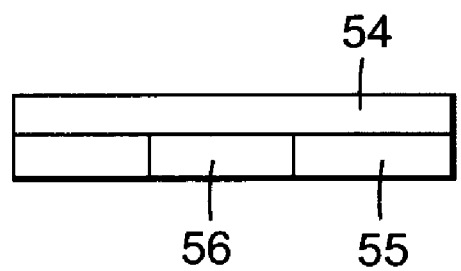
FIG. 7 is a cross-sectional view of the tactile sensor device of FIG. 6 taken along the line 7—7.

FIGS. 6 and 7 show the preferred tactile sensor device 38 in more detail. Preferably, the tactile sensor device 38, as shown, is formed so as to have one or more, preferably plural touch sensitive zones formed on a substrate 54 preferably the number of zones corresponds to the number of desired features to be sensed such as the lift pins 50, 51, and 52. Accordingly, the preferred tactile sensor device 38 comprises first touch sensitive zone 56, second touch sensitive zone 58, and third touch sensitive zone 60 that may be used to sense sequentially and/or simultaneously contact with structures such as the lift pins 50, 51, and 52 respectively of FIG. 3 or other reference structures, as the case may be. As shown, the touch sensitive zones are generally rectangular in shape and are arranged to be angularly disposed with respect to each other. It is contemplated the touch sensitive zones can be other shapes such as square, circular, triangular, etc.

It is contemplated that the tactile sensor device 38 may comprise a single touch sensitive zone or may comprise multiple touch sensitive zones. Multiple zones, when used, may be arranged in any desired way such as annularly, orthogonally, radially, etc. Preferably, the touch sensitive zones 56, 58, and 60 are of a size and shape and are arranged with respect to each other such that differing arrangements of reference structures to be sensed, such as lift pins or the like, can be simultaneously sensed as desired, with the same sensor device. Alternatively, the tactile sensor device 38 may be formed so as to have any number of touch sensitive zones having any shape and being positioned at any desired locations in order to sense one or more desired features within a work environment.

The substrate 54 may be any one or more suitable materials such as tempered glass, plastic, ceramic, metal and/or metal alloy such as titanium or stainless steel or combinations thereof. Preferably, the resolution of each of the touch sensitive zones is determined by considering factors such as, the desired precision and/or accuracy for a particular application. For example, an illustrative commercially available touch sensitive zone for the tactile sensor device 38 has a resolution of 4096×4096 pixels. Preferably, the structure 55 includes a signal-based connector 57 so that signals can be transmitted to and from the touch sensitive zones 56, 58, and 60 either by cables or by wireless technology or the like. Such touch sensitive structures, per se, are well known commercially.

Still referencing FIG. 6, the tactile sensor device 38 includes optional vacuum grip areas 62, 63, and 64. The areas 62, 63, and 64 may be used to attach the tactile sensor device 38 to the end effector 36 of the robot 22 such as with any suitable known or developed fasteners or the like. Alternatively, the end effector 36 may include any suitable means for holding the tactile sensor device 38 on the end effector 36. It is contemplated that the tactile sensor device 38 may be attached to the end effector 36 either permanently or releasably by any suitable means such that the functional aspects of the present invention, to accomplish teaching, are accomplished. The tactile sensor device 38 may be attached to the end effector 36 when needed such as by an operator or technician or may be attached in an automated manner by the robot itself or another robot. Alternatively, the tactile sensor device 38 may permanently attached to the robot but moveable at least between a passive and active (teaching or calibration) position.

Figure 9:
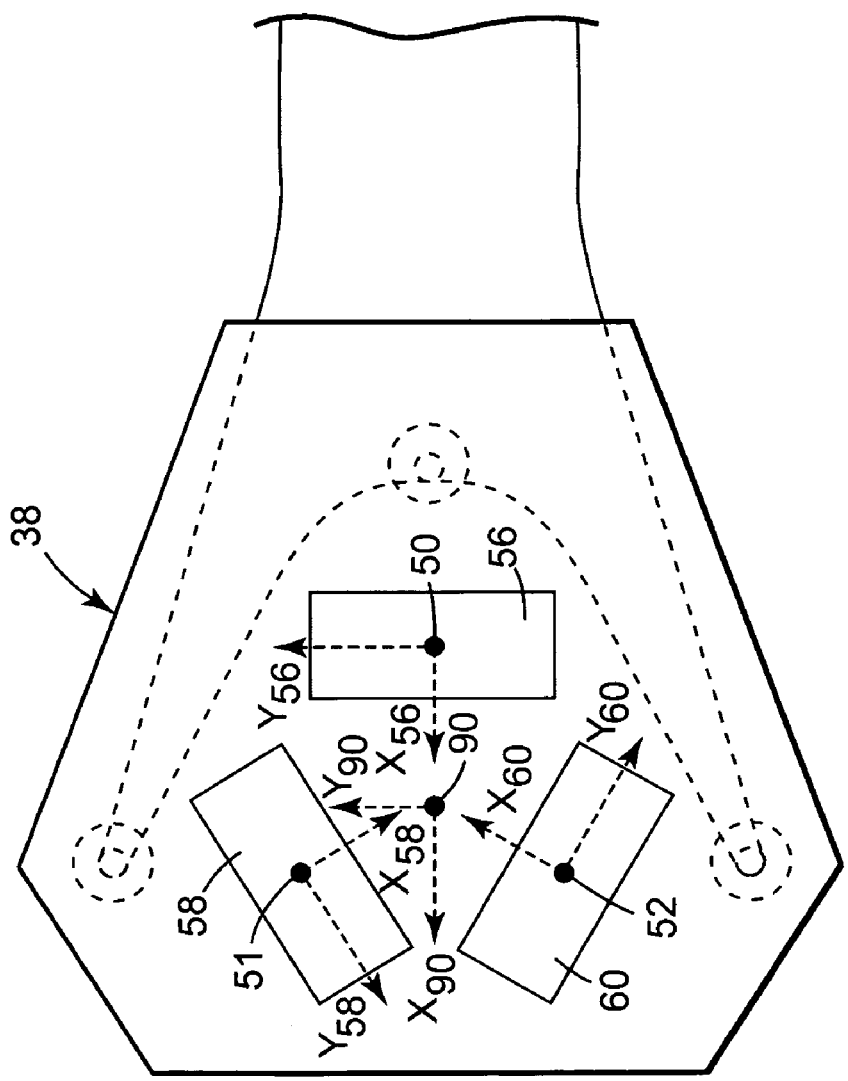
FIG. 9 is a top view of the tactile sensor device of the present invention shown in FIG. 2 and shown positioned on an end effector of a robot.

Preferably, teaching of the robot 12 can be accomplished by causing the robot 12 to first extend the end effector 36 with the tactile sensor device 38 so that the tactile sensor device 38 is positioned close to the desired structural feature(s) to be learned. For example, the robot 12 may be positioned so that the tactile sensor device 38 is positioned above the lift pins 50, 51, and 52 as shown in FIG. 9. The robot 12 maybe manually guided by a teach pendant, for example, and/or can be moved in an automatic or otherwise programmed move. Next, the robot 12 moves until contact is made between at least one of the touch sensitive surfaces or touch pads and a reference structures. As mentioned above, a tool control point is defined mathematically in the robot controller as the point to which all translation and rotation commands are applied. The robot 12 moves the tool control point to be oriented with the frame definition of the touch pad contacted, then pitches, rolls, and/or yaws until contact is made between a second touch pad and a second reference structure. The tool control point is now moved to the midpoint between the two contact points, with the tool x-axis pointing on the line that joins the two contact points. The end effector 36 is then pitched, rolled, and/or yawed until contact is made between a third touch pad and a third reference structure. Small moves may be made to verify that when the end effector 36 is lifted and dropped back down on the pins in small steps, contact is made with all three touch pads and pins within some predetermined ΔZ tolerance value. The machine position is calculated as described below:

Once the robot has found the position where all three touch pads are lightly resting on the machine lift pins 50, 51, 52, the robot has $^{A}P_{50}$, $^{B}P_{51}$, and $^{C}P_{52}$, where each $^{i}P_{j}$ represents the X,Y coordinate vector of lift pin j in reference frame i. In other words, these represent X,Y contact locations for each of the three lift pins on their respective touch pads. The reference frames A, B, and C correspond with the touch pads 56, 58, and 60 respectively.

In order to calculate machine positions, the X,Y coordinates of the lift pin tips must be transformed into the world coordinates of the robot reference frame, referred to as just the world frame or {W}. The following relationships may be used:

$$^{W}P_{50} = ^{W}_{t}T \cdot ^{t}_{A}T \cdot ^{A}P_{50}$$

$$^{W}P_{51} = ^{W}_{t}T \cdot ^{t}_{B}T \cdot ^{B}P_{51}$$

$$^{W}P_{52} = ^{W}_{t}T \cdot ^{t}_{C}T \cdot ^{C}P_{52}$$

wherein $^{W}P_{50}$ represents the X,Y coordinates of lift pin 50 in the world frame of the robot and $^{t}_{A}T$ represents the transform from the touch pad A to the robot tool frame (this transform is calculated during the calibration phase described below) and $^{W}_{t}T$ represents the transform between the tool control point of the robot and the world reference frame of the robot.

Figure 8:
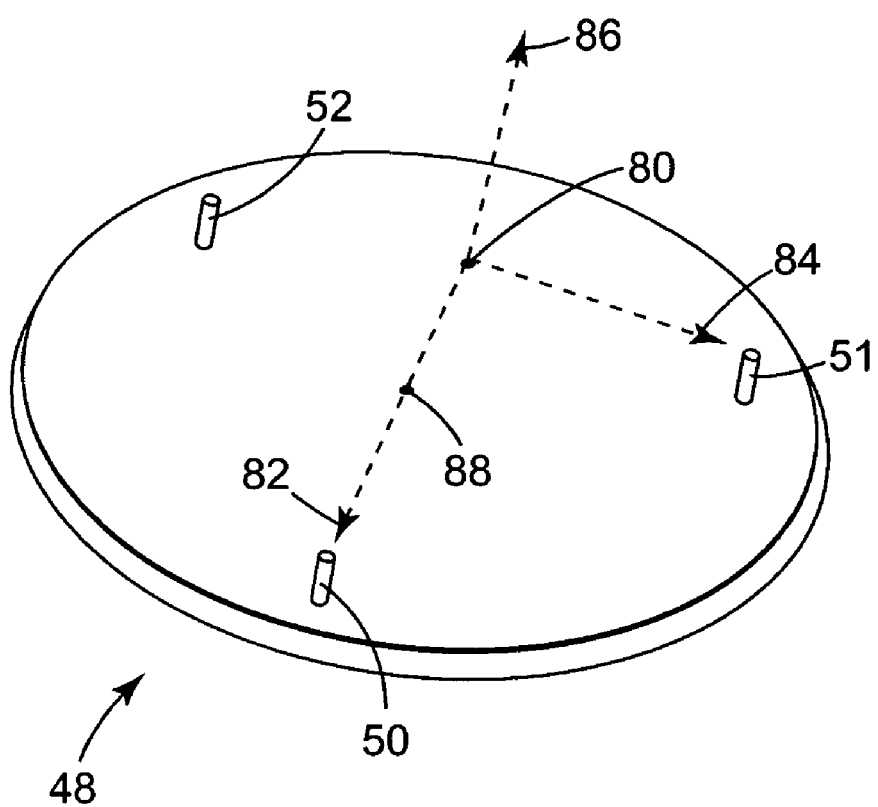
FIG. 8 is a perspective view of the processing platen of FIG. 4 showing in particular lift pins.

Once the locations of the lift pins are known in world frame, the machine location can be determined from the data known about the pin configuration. FIG. 8 shows the geometry of the process platen 48 and FIG. 9 shows a top view of the tactile sensor device 38 positioned on the end effector 36 of the robot 22 and also showing an exemplary tool control point 90. As shown in FIG. 8, $^{W}P_{D}$ is preferably defined as the midpoint between $^{W}P_{52}$ and $^{W}P_{51}$ (labeled as reference numeral 80 between pins 51 and 52). A new frame can be defined as {PINFRAME}, having an origin at $^{W}P_{D}$ and oriented as shown in FIG. 8 and having positive X axis 82, positive Y axis 84, and positive Z axis 86. In this example, the center of a wafer is desired to be placed at X=17.72 mm within the {PINFRAME}. To find point E in {W} frame:

$$^{W}P_{E} = ^{W}_{PINFRAME}T \cdot \begin{bmatrix} 17.72 \\ 0 \\ 0 \\ 1 \end{bmatrix}$$

Where $^{W}P_{E}$ is the machine location to store in robot memory (labeled as reference numeral 88).

There may be sources of error in the above-described procedure due to inaccuracies inherent in the touch sensitive surface; the manner by which the tactile sensor device is positioned with respect to the robot, etc. As such, any errors that may exist can be minimized if desired. Firstly, there may be a robot accuracy error. For example, the ability of the robot to move to a computed point is a measure of its accuracy. This error becomes larger when $^{W}P_{E}$ is not the same position as the tool position of the robot. The robot must depend on its accuracy to move from where it is now, to $^{W}P_{E}$. To minimize this source of error, $^{W}P_{E}$ can be determined through several iterations, each time starting with the tool control point of the robot at the previous $^{W}P_{E}$ position.

Also, there can be an error due to mapping between the touch sensor frames and the tool control point. That is, $^{t}_{A}T$ is dependent on both the accuracy of the manufacturing process used to make the tactile sensor device, and the how accurately the tactile sensor device is placed on the end effector of the robot. This source of error can be measured and compensated for in the calibration procedure as described below.

An additional error may be caused by non-linearities that may exist in certain touch sensitive surfaces. That is, the touch pads are typically made of plastics with conductive coatings. They are prone to stretch during the manufacturing process. This stretching can result in a non-linear response. For example, the physical distance between pixel $X_{1000}$ and $X_{2000}$ may be 10 mm, while the physical distance between $X_{2000}$ and $X_{3000}$ may be 12 mm. To compensate for this non-linear response, bilinear interpolation can be used to map the surface of the touch pad.

Figure 10:
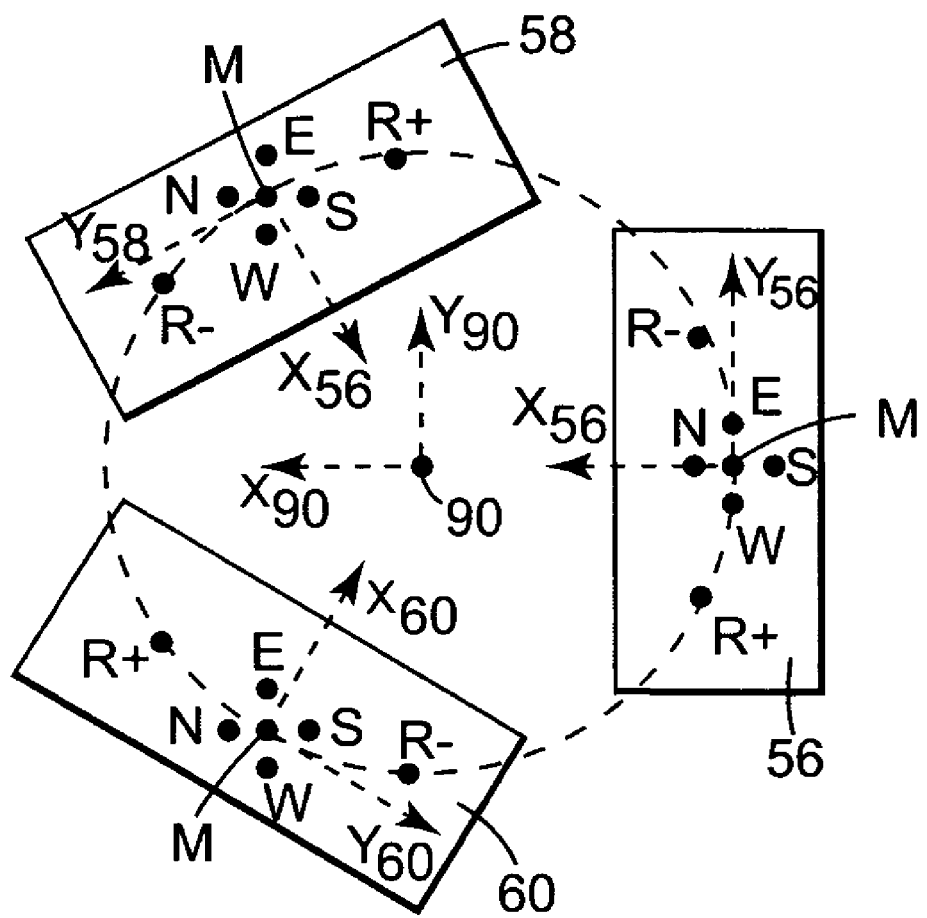
FIG. 10 is a schematic view of three touch sensitive zones of the present invention of the tactile sensor of FIG. 9.

The calibration of $^{t}_{A}T$ may be performed by touching several points on each touch pad as shown in FIG. 10. Recall that the lift pin arrangement shown in FIG. 8 has three pins, so a point such as point N is registered on all three touch pads at the same time. The points N,S, M can be reached by moving the end effector 36 along the +/−Xt axis and lowering the tactile sensor device 38 down onto the lift pins until contact is made. Points E and W can be made in the same way by moving the tactile sensor device along the +/−Yt axis. Points +R and −R can be obtained by moving the tactile sensor device through small rotations about the Zt axis.

A goal of the calibration phase is to define the elements of the $^{t}_{B}T$ matrix and the scale values to convert touch pad counts to millimeters. Calibration data for all three touch pads may be determined similarly. As such, the preferred calculations for touch pad B are described below and may be repeated for touch pads A and C.

The transform consist of a rotation on the Z axis, and a X,Y translation.

$$_B^tT = {_t^BT}^{-1} = \begin{bmatrix} \cos\theta & -\sin\theta & 0 & Xcor \\ \sin\theta & \cos\theta & 0 & Ycor \\ 0 & 0 & 1 & 0 \\ 0 & 0 & 0 & 1 \end{bmatrix}^{-1}$$

Wherein θ represents the angle between the +X axis of the touch pad and the +X axis of the robot tool frame and Xcor represents the distance from the origin of the touch pad to the center of rotation of the tool frame of the robot as measured along the +X axis of the touch pad and wherein Ycor represents the distance from the origin of the touch pad to the center of rotation of the tool frame of the robot as measured along the +Y axis of the touch pad. The scalar values for each axis on the touch pad are represented as Bsx and Bsy. These values are multiplied by the touch pad A/D values to convert them to millimeters.

To calculate the angle of the touch pad to the tool frame, points N, S, E, W are compared to point M. Since Bsx and Bsy have not been calculated yet, initial estimates will be used. The angle of the touch pad to the tool frame is measured as:

$\theta_N = a\tan[\Delta X(mm)/\Delta Y(mm)]$ $\theta_S = a\tan[\Delta X(mm)/\Delta Y(mm)]$ $\theta_E = a\tan[\Delta Y(mm)/\Delta X(mm)]$ $\theta_W = a\tan[\Delta Y(mm)/\Delta X(mm)]$ where:
ΔX=the difference between the X value of M, minus the X value of N in millimeters.
ΔY=the difference between the Y value of M, minus the Y value of N in millimeters.

The results of all four comparisons are averaged to get the final θ value.

To refine the values of Bsx and Bsy, the tool control point of the robot is rotated by the angle found above and the 5 contact points (N, S, E, W, M) are repeated. This time, the N and S points will be 10 mm from point M and will be aligned with the Y axis of the touch pad. The E and W points will also be 10 mm from point M and aligned with the X axis of the touch pad.

$Bsx = (10 \text{ mm}/(Wx-Mx)\text{pixels} + 10 \text{ mm}/(Mx-Ex)\text{pixels})/2$ $Bsy = (10 \text{ mm}/(Ny-My)\text{pixels} + 10 \text{ mm}/(My-Sy)\text{pixels})/2$ The process of finding the angle then finding the scale factors may be repeated for a few iterations until changes become small. As mentioned earlier, an entire grid of points could now be collected to calibrate the touch screen with the method of bilinear interpolation.

The center of the robot tool can be determined as follows. From the points M, R+ and R−, a circle is defined. Since the only difference between these three points is a rotation about the tool Z axis, it is known that the center of the circle is at the origin of the tool. By calculating the center of the circle by utilizing a least squares circle fit, Xcor and Ycor are defined, and the calibration is completed.

Thus, the present invention provides a touch calibration method, which enables a multi-axis robot machine to automatically precisely locate physical, fixed objects within its working envelope. This method is particularly suited towards robotic applications where a multi-axis robot operates within a defined environment and moves to or interacts with various process station locations. It enables the robot to automatically locate these stations with high precision by touching known and distinct features on each station.

Numerous characteristics and advantages of representative embodiments of the invention have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A method of teaching a robot a position within a work environment of the robot, the method comprising the steps of:
   providing a touch sensitive surface in the work environment of the robot, the touch sensitive surface having a plurality of touch sensitive zones that can simultaneously sense a touch in each of the touch sensitive zones;
   causing the touch sensitive surface to contact at least one object in the work environment of the robot;
   generating a signal indicative of the position of the at least one contact with respect to the touch sensitive surface; and
   using information comprising the generated signal to teach the robot the location of the contact in the work environment of the robot.

2. The method of claim 1, wherein the step of providing a touch sensitive surface in the work environment of the robot comprises positioning a touch sensitive surface on a movable component of the robot, the touch sensitive surface having a frame of reference and the robot having a frame of reference.

3. The method of claim 2, further comprising the step of determining positional information within the frame of reference of the touch sensitive surface by causing the touch sensitive surface to contact a plurality of locations on the touch sensitive surface with at least one reference structure.

4. The method of claim 3, further comprising the step of using the determined positional information within the frame of reference of the touch sensitive surface to calibrate the frame of reference of the robot with respect to the frame of reference of the touch sensitive surface.

5. The method of claim 2, wherein the step of positioning a touch sensitive surface on a movable component of the robot comprises releasably attaching the touch sensitive surface to the movable component of the robot.

6. The method of claim 2, wherein the step of positioning a touch sensitive surface on a movable component of the robot comprises permanently attaching the touch sensitive surface to the movable component of the robot.

7. The method of claim 1, wherein the step of causing the touch sensitive surface to contact an object in the work environment of the robot comprises contacting a portion of the work environment at a desired location to be learned.

8. The method of claim 7 wherein the reference structure comprises a plurality of reference elements that respectively correspond with the plurality of touch sensitive zones of the touch sensitive surface.

9. The method of claim 1, wherein the step of causing the touch sensitive surface to contact an object in the work environment of the robot comprises contacting a removable reference structure positioned in the work environment of the robot.

10. A method of teaching a robot a position within a work environment, the method comprising the steps of:
providing a touch sensitive surface on a moveable component of a robot and being positioned within a work environment;
determining positional information within a frame of reference of the touch sensitive surface by moving the moveable component of the robot so that the touch sensitive surface contacts at least a portion of the work environment indicative of the position to be taught; and
using the positional information within the frame of reference of the touch sensitive surface to determine positional information within a frame of reference of the robot.

11. The method of claim 10, further comprising the step of moving the moveable component of the robot so that the touch sensitive surface contacts plural portions of the work environment.

12. The method of claim 10, wherein the step of providing a touch sensitive surface comprises providing a touch sensitive surface comprising a plurality of touch sensitive zones.

13. The method of claim 12, further comprising the step of moving the movable component of the robot so that at least one of the plurality of touch sensitive zones of the touch sensitive surface contacts at least a portion of the work environment of the robot.

14. The method of claim 13, further comprising the step of moving the movable component of the robot so that at least one additional touch sensitive zone of the plurality of touch sensitive zones of the touch sensitive surface contacts at least a portion of the work environment of the robot.

15. A tactile sensor system for providing positional information about a moveable component of a robot in a work environment of the robot, the tactile sensor system comprising:
a tactile sensor device including at least one touch sensitive zone;
programming instructions that cause the system to determine positional information in a frame of reference of the touch sensitive zone about a contact between the touch sensitive zone and a structure wherein the positional information comprises data indicative that a contact occurred and indicative of the location in the frame of reference of the touch sensitive zone where the contact occurred; and
a control system that uses information comprising information from the tactile sensor device to determine the position of the moveable component of the robot in the work environment of the robot.

16. The system of claim 15, wherein the at least one touch sensitive zone comprises a touch sensitive surface.

17. The system of claim 15, wherein the tactile sensor device comprises a plurality of touch sensitive zones.

18. The system of claim 15, wherein the tactile sensor device is releasably attached to a movable component of a robot.

19. The system of claim 15, wherein the tactile sensor device is permanently attached to a movable component of a robot.

20. A robotic system, the robotic system comprising;
a work environment;
a robot positioned at least partially within the work environment and having at least one moveable component for interacting with the work environment;
a touch sensitive surface positioned at least partially on the moveable component of the robot that can provide information indicative of the position of at least a portion of the moveable component of the robot in the work environment.

21. The system of claim 20, wherein the touch sensitive surface comprises a plurality of touch sensitive zones.

22. The system of claim 20, wherein the touch sensitive surface is releasably attached to the movable component of the robot.

23. The system of claim 20, wherein the touch sensitive surface is permanently attached to the movable component of the robot.

24. A method of teaching a robot a position within a work environment of the robot, the method comprising the steps of:
providing a touch sensitive surface in the work environment of the robot, the touch sensitive surface having a plurality of touch sensitive zones;
causing the touch sensitive surface to contact at least one object in the work environment of the robot;
generating a signal indicative of the position of the at least one contact with respect to the touch sensitive surface; and
using information comprising the generated signal to teach the robot the location of the contact in the work environment of the robot.

* * * * *